US005640463A

United States Patent [19]
Csulits

[11] Patent Number: 5,640,463
[45] Date of Patent: Jun. 17, 1997

[54] METHOD AND APPARATUS FOR AUTHENTICATING DOCUMENTS INCLUDING CURRENCY

[75] Inventor: Frank M. Csulits, Gurnee, Ill.

[73] Assignee: Cummins-Allison Corp., Mt. Prospect, Ill.

[21] Appl. No.: 317,349

[22] Filed: Oct. 4, 1994

[51] Int. Cl.⁶ .................................................. G06K 9/00
[52] U.S. Cl. ........................................ 382/135; 194/207
[58] Field of Search ........................... 382/135, 137, 382/138, 139, 140, 191, 312, 321; 194/207, 303; 209/534, 578, 583; 250/556, 208.2, 227.18, 227.23, 574, 461.1, 372

[56] References Cited

U.S. PATENT DOCUMENTS

| | | | |
|---|---|---|---|
| 3,618,765 | 11/1971 | Cooper et al. | 209/534 |
| 3,842,281 | 10/1974 | Goodrich | 250/461 |
| 4,114,804 | 9/1978 | Jones et al. | 235/476 |
| 4,277,774 | 7/1981 | Fujii et al. | 340/146.3 |
| 4,313,598 | 2/1982 | DiBlasio | 271/124 |
| 4,480,177 | 10/1984 | Allen | 235/379 |
| 4,558,224 | 12/1985 | Gober | 250/460.1 |
| 4,567,370 | 1/1986 | Falls | 250/461.1 |
| 4,653,647 | 3/1987 | Hashimoto | 209/534 |
| 4,677,682 | 6/1987 | Miyagawa et al. | 382/7 |
| 4,908,516 | 3/1990 | West | 250/556 |
| 5,027,415 | 6/1991 | Hara et al. | 382/135 |
| 5,163,672 | 11/1992 | Mennie | 271/187 |
| 5,207,788 | 5/1993 | Geib et al. | 271/122 |
| 5,295,196 | 3/1994 | Raterman et al. | 382/7 |
| 5,304,813 | 4/1994 | DeMan . | |
| 5,341,408 | 8/1994 | Melcher et al. | 377/8 |
| 5,367,577 | 11/1994 | Gotaas | 382/135 |
| 5,430,664 | 7/1995 | Cargill et al. | 364/550 |
| 5,467,406 | 11/1995 | Graves et al. | 382/135 |

FOREIGN PATENT DOCUMENTS

| | | | |
|---|---|---|---|
| 101115 | 2/1984 | European Pat. Off. | G07D 7/00 |
| 2190996 | 12/1987 | United Kingdom | G06K 5/00 |
| WO90/07165 | 6/1990 | WIPO | G07D 7/00 |
| WO91/11778 | 8/1991 | WIPO . | |
| WO93/23824 | 11/1993 | WIPO . | |
| WO94/19773 | 9/1994 | WIPO . | |

OTHER PUBLICATIONS

JetScan Currency Scanner/Counter, Model 4060, Operator's Manual by Cummins-Allison (Aug. 1991).
Sale of JetScan Currency Scanner/Counter, Model 4060 (Aug. 1991).
JetScan Currency Scanner/Counter, Model 4061, Operating Instructions by Cummins-Allison (Apr. 20, 1993).
Sale of JetScan Currency Scanner/Counter, Model 4061 (Apr. 20, 1993).

*Primary Examiner*—Leo Boudreau
*Assistant Examiner*—Phuoc Tran
*Attorney, Agent, or Firm*—Arnold, White & Durkee

[57] ABSTRACT

A method and device for authenticating documents comprising an ultraviolet light source illuminating a document to be tested; an ultraviolet light detector generating an output signal responsive to ultraviolet light reflected by the document; and a signal processor receiving the ultraviolet detector output signal and determining the authenticity of the document based upon said output signal.

72 Claims, 2 Drawing Sheets

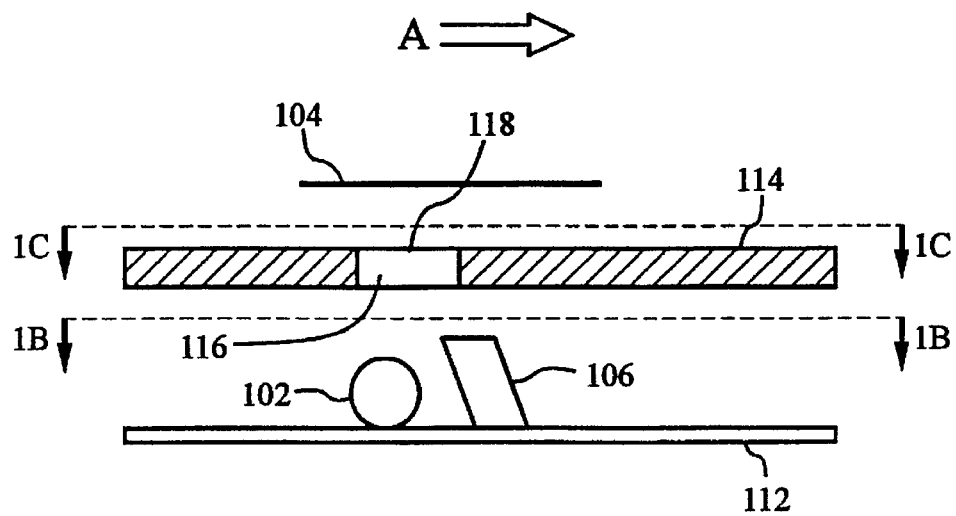
FIG. 1A
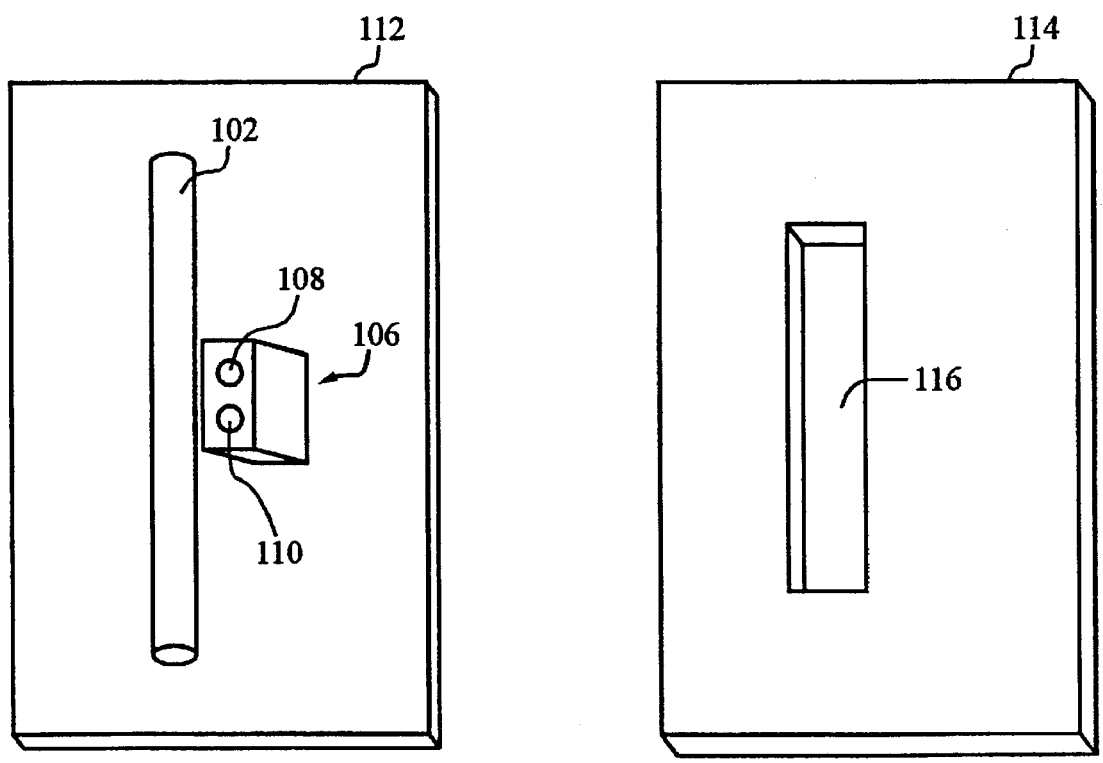
FIG. 1B
FIG. 1C

METHOD AND APPARATUS FOR AUTHENTICATING DOCUMENTS INCLUDING CURRENCY

BACKGROUND OF THE INVENTION

Field of the Invention

The present invention relates, in general, to document authentication. More specifically, the present invention relates to an apparatus and method for authenticating documents such as currency bills by illuminating the documents with ultraviolet light.

Background

A number of methods have been developed for authenticating the genuineness of security documents. These methods include sensing magnetic, optical, conductive, and other characteristics of documents under test. In general, it has been found that no single authentication test is capable of detecting all types of counterfeit documents while at the same time not rejecting any genuine documents. Therefore, more than one test may be employed whereby a first test is used to detect certain types of counterfeits and additional tests are used to detect other types of counterfeits.

It has been known that the illumination of certain substances with ultraviolet light causes the substances to fluoresce, that is, to emit visible light. Some documents employ fluorescent materials as a security feature to inhibit counterfeiting. Typically, these fluorescent security features comprise a marking which is visibly revealed when the document is illuminated with ultraviolet light. Previous methods have been developed to authenticate such documents by sensing the fluorescent light emitted by a document illuminated by ultraviolet light and comparing the sensed fluorescent light to the fluorescent light emitted by genuine documents.

Conversely, some documents, such as United States currency, are manufactured from special paper designed not to fluoresce under ultraviolet light. Previously known authenticating methods for such documents have sensed for the emission of fluorescent light under ultraviolet illumination and have rejected as counterfeit those documents emitting fluorescent light.

However, it has been found that the presently known ultraviolet authentication methods do not detect all types of counterfeits. For example, while many counterfeit United States bills do emit fluorescent light under ultraviolet illumination, some counterfeit United States bills do not.

SUMMARY OF THE INVENTION

It is an object of the present invention to provide an improved method and apparatus for authenticating documents including currency documents.

It is another object of the present invention to provide an improved method and apparatus for authenticating United States currency bills.

It is another object of the present invention to provide an improved method and apparatus for authenticating documents which may be employed in a currency discriminating apparatus.

It is an object of the present invention to provide an improved method and apparatus for authenticating documents including currency documents by illuminating a document with ultraviolet light.

It is another object of the present invention to provide an improved method and apparatus for authenticating documents which improves the ability of a system to accurately reject improper documents while reducing the likelihood of rejecting genuine documents.

Briefly, the objectives enumerated above are achieved according to a preferred embodiment of the present invention by illuminating a document to be authenticated with ultraviolet light and measuring the amount of ultraviolet light which is reflected off the document. Based on the amount of ultraviolet light which is detected, the document is either authenticated or rejected. In the case of documents being authenticated relative to United States currency, a bill is rejected if a high level of reflected ultraviolet light is not detected.

In another preferred embodiment, the above objectives are achieved by illuminating a document with ultraviolet light and measuring both the amount of reflected ultraviolet light and the amount of emitted visible light. Based on the amount of ultraviolet light detected and the amount of visible light detected, a document is either authenticated or rejected. In the case of documents being authenticated relative to United States currency, a bill is rejected if either a high level of reflected ultraviolet light is not detected or even a low level of visible light is detected.

As explained above, it is known that some counterfeit United States bills fluoresce, or emit visible light, when illuminated by ultraviolet light. As genuine United States currency does not fluoresce, the emission of visible light has been employed as a means of detecting counterfeit United States currency. However, it has been found that not all counterfeit United States bills fluoresce; and hence, such counterfeits will not be detected by the above described fluorescence test.

It has been found that genuine United States currency reflects a high level of ultraviolet light when illuminated by an ultraviolet light source. It has also been found that some counterfeit United States bills do not reflect a high level of ultraviolet light. Such counterfeit bills may or may not also fluoresce under ultraviolet light. The present invention employs an authentication test wherein the amount of reflected ultraviolet light is measured and a bill is rejected if it does not reflect a high amount of ultraviolet light. By employing such a test, counterfeit United States bills which do not reflect a high level of ultraviolet light may be properly rejected.

While not all counterfeit United States bills fail to reflect a high level of ultraviolet light and hence not all counterfeit United States bills will be detected using this test, the present invention provides an additional means for detecting counterfeit bills which might otherwise go undetected. Furthermore, the likelihood of a counterfeit United States bill going undetected may be further reduced by employing an alternative embodiment of the present invention wherein both the amount of reflected ultraviolet light and the amount of emitted visible light are measured. In such a system, a bill is rejected as counterfeit if either it fails to reflect a high level of ultraviolet light or it fluoresces.

The above described embodiments may be adapted to authenticate currencies from other countries and other types of documents such as food stamps and checks. For instance some genuine documents may be designed to reflect ultraviolet light only in certain locations and/or in a predetermined pattern. An alternative embodiment of the present invention may be designed to accept documents which exhibit similar characteristics while rejecting those which do not. Likewise, an alternative embodiment of the present invention may be employed to authenticate documents based on both their characteristics with respect to reflected ultraviolet light and their characteristics with respect to fluorescent emissions, e.g., detecting the amount, location, and/or pattern of fluorescent emissions.

BRIEF DESCRIPTION OF THE DRAWINGS

Other objects and advantages of the invention will become apparent upon reading the following detailed description in conjunction with the drawings in which:

FIG. 1A is a side view of a preferred embodiment of a document authenticating system according to the present invention;

FIG. 1B is a top view of the preferred embodiment of FIG. 1A along the direction 1B;

FIG. 1C is a top view of the preferred embodiment of FIG. 1A along the direction 1C.

DETAILED DESCRIPTION OF THE PREFERRED EMBODIMENTS

Figure 2:
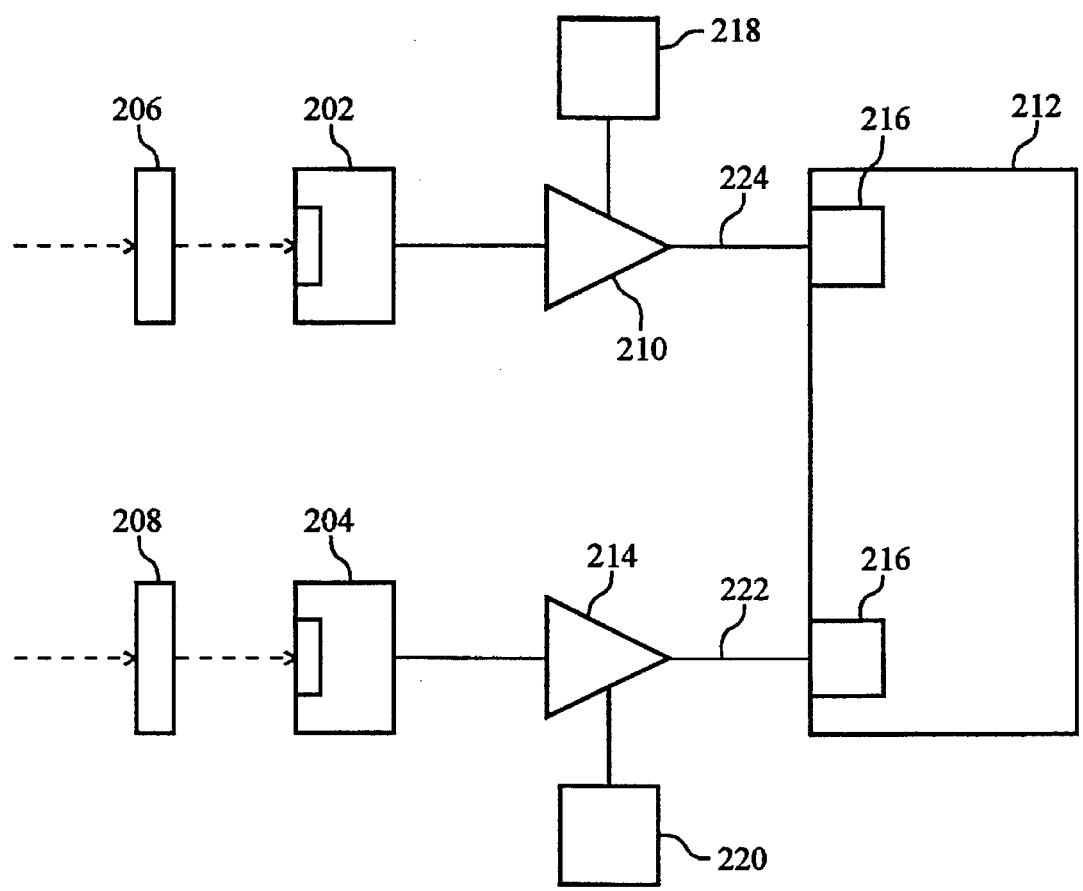
FIG. 2 is a functional block diagram illustrating a preferred embodiment of a document authenticating system according to the present invention.

Referring now to FIGS. 1A–1C, there is shown a side view of a preferred embodiment of a document authenticating system according to the present invention, a top view of the preferred embodiment of FIG. 1A along the direction 1B, and a top view of the preferred embodiment of FIG. 1A along the direction 1C, respectively. An ultraviolet ("UV") light source 102 illuminates a document 104. Depending upon the characteristics of the document, ultraviolet light may be reflected off the document and/or fluorescent light may be emitted from the document. A detection system 106 is positioned so as to receive any light reflected or emitted toward it but not to receive any UV light directly from the light source 102. The detection system 106 comprises a UV sensor 108, a fluorescence sensor 110, filters, and a plastic housing. The light source 102 and the detection system 106 are both mounted to a printed circuit board 112. The document 104 is transported in the direction indicated by arrow A by a transport system (not shown). The document is transported over a transport plate 114 which has a rectangular opening 116 in it to permit passage of light to and from the document. In a preferred embodiment of the present invention, the rectangular opening 116 is 1.375 inches (3.493 cm) by 0.375 inches (0.953 cm). To minimize dust accumulation onto the light source 102 and the detection system 106 and to prevent document jams, the opening 116 is covered with a transparent UV transmitting acrylic window 118. To further reduce dust accumulation, the UV light source 102 and the detection system 106 are completely enclosed within a housing (not shown) comprising the transport plate 114.

Referring now to FIG. 2, there is shown a functional block diagram illustrating a preferred embodiment of a document authenticating system according to the present invention. FIG. 2 shows an UV sensor 202, a fluorescence sensor 204, and filters 206, 208 of a detection system such as the detection system 106 of FIG. 1. Light from the document passes through the filters 206, 208 before striking the sensors 202, 204, respectively. An ultraviolet filter 206 filters out visible light and permits UV light to be transmitted and hence to strike UV sensor 202. Similarly, a visible light filter 208 filters out UV light and permits visible light to be transmitted and hence to strike fluorescence sensor 204. Accordingly, UV light, which has a wavelength below 400 nm, is prevented from striking the fluorescence sensor 204 and visible light, which has a wavelength greater than 400 nm, is prevented from striking the UV sensor 202. In a preferred embodiment the UV filter 206 transmits light having a wavelength between about 260 nm and about 380 nm and has a peak transmittance at 360 nm. In a preferred embodiment, the visible light filter 208 is a blue filter and preferably transmits light having a wavelength between about 415 nm and about 620 nm and has a peak transmittance at 450 nm. The above preferred blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott. In a preferred embodiment the filters are about 8 mm in diameter and about 1.5 mm thick.

The UV sensor 202 outputs an analog signal proportional to the amount of light incident thereon and this signal is amplified by amplifier 210 and fed to a microcontroller 212. Similarly, the fluorescence sensor 204 outputs an analog signal proportional to the amount of light incident thereon and this signal is amplified by amplifier 214 and fed to a microcontroller 212. Analog-to-digital converters 216 within the microcontroller 212 convert the signals from the amplifiers 210, 214 to digital and these digital signals are processed by the software of the microcontroller 212. The UV sensor 202 may be, for example, an ultraviolet enhanced photodiode sensitive to light having a wavelength of about 360 nm and the fluorescence sensor 204 may be a blue enhanced photodiode sensitive to light having a wavelength of about 450 nm. Such photodiodes are available from, for example, Advanced Photonix, Inc., Mass. The microcontroller 212 may be, for example, a Motorola 68HC16.

The exact characteristics of the sensors 202, 204 and the filters 206, 208 including the wavelength transmittance ranges of the above filters are not as critical to the present invention as the prevention of the fluorescence sensor from generating an output signal in response to ultraviolet light and the ultraviolet sensor from generating an output signal in response to visible light. For example, instead of, or in addition to, filters, a authentication system according to the present invention may employ an ultraviolet sensor which is not responsive to light having a wavelength longer than 400 nm and/or a fluorescence sensor which is not responsive to light having a wavelength shorter than 400 nm.

Calibration potentiometers 218, 220 permit the gains of amplifiers 210, 214 to be adjusted to appropriate levels. Calibration may be performed by positioning a piece of white fluorescent paper on the transport plate 114 so that it completely covers the rectangular opening 116 of FIG. 1. The potentiometers 218, 220 may then be adjusted so that the output of the amplifiers 210, 214 is 5 volts.

The implementation of the preferred embodiment of a document authenticating system according to the present invention as illustrated in FIG. 2 with respect to the authentication of U.S. currency will now be described. As discussed above, it has been determined that genuine U.S. currency reflects a high level of ultraviolet light and does not fluoresce under ultraviolet illumination. It has also been determined that under ultraviolet illumination counterfeit United States currency exhibits one of the four sets of characteristics listed below:

1) Reflects a low level of ultraviolet light and fluoresces;

2) Reflects a low level of ultraviolet light and does not fluoresce;

3) Reflects a high level of ultraviolet light and fluoresces;

4) Reflects a high level of ultraviolet light and does not fluoresce. Counterfeit bills in categories (1) and (2) may be detected by a currency authenticator employing an ultraviolet light reflection test according to a preferred embodiment of the present invention. Counterfeit bills in category (3) may be detected by a currency authenticator employing both an ultraviolet reflection test and a fluorescence test according to another preferred embodiment of the present invention. Only counterfeits in category (4) are not detected by the authenticating methods of the present invention.

According to a preferred embodiment of the present invention, fluorescence is determined by any signal that is above the noise floor. Thus, the amplified fluorescent sensor signal 222 will be approximately 0 volts for genuine U.S. currency and will vary between approximately 0 and 5 volts for counterfeit bills depending upon their fluorescent characteristics. Accordingly, an authenticating system according to a preferred embodiment of the present invention will reject bills when signal 222 exceeds approximately 0 volts.

According to a preferred embodiment of the present invention, a high level of reflected UV light ("high UV") is indicated when the amplified UV sensor signal 224 is above a predetermined threshold. The high/low UV threshold is a function of lamp intensity and reflectance. Lamp intensity can degrade by as much as 50% over the life of the lamp and can be further attenuated by dust accumulation on the lamp and the sensors. The problem of dust accumulation is mitigated by enclosing the lamp and sensors in a housing as discussed above. An authenticating system according to a preferred embodiment of the present invention tracks the intensity of the UV light source and readjusts the high/low threshold accordingly. The degradation of the UV light source may be compensated for by periodically feeding a genuine bill into the system, sampling the output of the UV sensor, and adjusting the threshold accordingly. Alternatively, degradation may be compensated for by periodically sampling the output of the UV sensor when no bill is present in the rectangular opening 116 of the transport plate 114. It is noted that a certain amount of UV light is always reflected off the acrylic window 118. By periodically sampling the output of the UV sensor when no bill is present, the system can compensate for light source degradation. Furthermore, such sampling could also be used to indicate to the operator of the system when the ultraviolet light source has burned out or otherwise requires replacement. This may be accomplished, for example, by means of a display reading or an illuminated light emitting diode ("LED"). The amplified ultraviolet sensor signal 224 will initially vary between 1.0 and 5.0 volts depending upon the UV reflectance characteristics of the document being scanned and will slowly drift downward as the light source degrades. In an alternative preferred embodiment to a preferred embodiment wherein the threshold level is adjusted as the light source degrades, the sampling of the UV sensor output may be used to adjust the gain of the amplifier 210 thereby maintaining the output of the amplifier 210 at its initial levels.

It has been found that the voltage ratio between counterfeit and genuine U.S. bills varies from a discernable 2-to-1 ratio to a non-discernable ratio. According to a preferred embodiment of the present invention a 2-to-1 ratio is used to discriminate between genuine and counterfeit bills. For example, if a genuine U.S. bill generates an amplified UV output sensor signal 224 of 4.0 volts, documents generating an amplified UV output sensor signal 224 of 2.0 volts or less will be rejected as counterfeit. As described above, this threshold of 2.0 volts may either be lowered as the light source degrades or the gain of the amplifier 210 may be adjusted so that 2.0 volts remains an appropriate threshold value.

According to a preferred embodiment of the present invention, the determination of whether the level of UV reflected off a document is high or low is made by sampling the output of the UV sensor at a number of intervals, averaging the readings, and comparing the average level with the predetermined high/low threshold. Alternatively, a comparison may be made by measuring the amount of UV light reflected at a number of locations on the bill and comparing these measurements with those obtained from genuine bills. Alternatively, the output of one or more UV sensors may be processed to generate one or more patterns of reflected UV light and these patterns may be compared to the patterns generated by genuine bills. Such a pattern generation and comparison technique may be performed by modifying an optical pattern technique such as that disclosed in U.S. Pat. No. 5,295,196 incorporated herein by reference in its entirety or in U.S. patent application Ser. No. 08/287,882 filed Aug. 9, 1994 for a "Method and Apparatus for Document Identification," incorporated herein by reference in its entirety.

In a similar manner, the presence of fluorescence may be performed by sampling the output of the fluorescence sensor at a number of intervals. However, in a preferred embodiment, a bill is rejected as counterfeit U.S. currency if any of the sampled outputs rise above the noise floor. However, the alternative methods discussed above with respect to processing the signal or signals of a UV sensor or sensors may also be employed, especially with respect to currencies of other countries or other types of documents which may employ as security features certain locations or patterns of fluorescent materials.

A currency authenticating system according to the present invention may be provided with means, such as a display, to indicate to the operator the reasons why a document has been rejected, e.g., messages such as "UV FAILURE" or "FLUORESCENCE FAILURE." A currency authenticating system according to the present invention may also permit the operator to selectively choose to activate or deactivate either the UV reflection test or the fluorescence test or both. A currency authenticating system according to the present invention may also be provided with means for adjusting the sensitivities of the UV reflection and/or fluorescence test, for example, by adjusting the respective thresholds. For example, in the case of U.S. currency, a system according to the present invention may permit the high/low threshold to be adjusted, for example, either in absolute voltage terms or in genuine/suspect ratio terms.

While the present invention has been described with reference to one or more particular embodiments, those skilled in the art will recognize that many changes may be made thereto without departing from the spirit and scope of the present invention, which is set forth in the following claims.

I claim:

1. A method of authenticating documents comprising the steps of:

illuminating a document with ultraviolet light;

detecting ultraviolet light reflected by said document; and determining the authenticity of said document based upon a comparison of the ultraviolet light reflected from said bill with the ultraviolet light reflected from a genuine document illuminated with ultraviolet light.

2. The method of claim 1 wherein said detecting step comprises the step of detecting the presence or absence of ultraviolet light reflected from one or more areas of said document.

3. The method of claim 1 wherein said detecting step comprises the step of detecting a pattern of ultraviolet light reflected by said document.

4. The method of claim 3 wherein the authenticity of said document is determined relative to genuine currency.

5. The method of claim 4 wherein the authenticity of said document is determined relative to genuine United States currency.

6. The method of claim 1 wherein said detecting step comprises the step of detecting the amount of ultraviolet light reflected from one or more areas of said document.

7. The method of claim 6 wherein the authenticity of said document is determined relative to genuine currency.

8. The method of claim 1 wherein said detecting step further comprises the step of filtering light to be detected through an ultraviolet filter.

9. The method of claim 1 wherein said detecting step further comprises the step of filtering out light having a wavelength longer than 400 nm.

10. The method of claim 9 wherein said filtering step comprises the step of filtering out light having a wavelength shorter than about 260 nm and light having a wavelength longer than about 380 nm.

11. The method of claim 1 wherein said detecting step is performed by a detector which is not sensitive to light having a wavelength longer than 400 nm.

12. The method of claim 2 wherein the authenticity of said document is determined relative to genuine currency.

13. The method of claim 12 wherein the authenticity of said document is determined relative to genuine United States currency.

14. A method of authenticating documents comprising the steps of:
illuminating a document with ultraviolet light;
detecting ultraviolet light reflected by said document; and
determining the authenticity of said document based upon a comparison of the ultraviolet light reflected from said bill with the ultraviolet light reflected from a genuine document illuminated with ultraviolet light; wherein the authenticity of said document is determined relative to genuine United States currency and wherein a negative determination of authenticity is made regarding said document if a relatively high amount of ultraviolet light is not reflected from said document.

15. A method of authenticating documents comprising the steps of:
illuminating a document with ultraviolet light;
detecting ultraviolet light reflected by said document;
detecting visible light emitted from said document; and
determining the authenticity of said document based upon a comparison of the ultraviolet light reflected from said bill with the ultraviolet light reflected from a genuine document illuminated with ultraviolet light and based upon a comparison of the visible light emitted from said document with the visible light emitted from a genuine document illuminated with ultraviolet light.

16. The method of claim 15 wherein said ultraviolet light detecting step comprises the step of detecting the amount of ultraviolet light reflected from one or more areas of said document and said visible light detecting step comprises the step of detecting the amount of visible light emitted from one or more areas of said document.

17. The method of claim 16 wherein the authenticity of said document is determined relative to genuine currency.

18. The method of claim 17 wherein the authenticity of said document is determined relative to genuine United States currency and wherein a positive determination of authenticity is made regarding said document only if a relatively high amount of ultraviolet light is reflected from said document and virtually no amount of visible light is emitted from said document.

19. The method of claim 17 wherein a positive determination of authenticity is made regarding said document only if an amount of ultraviolet light reflected from said document exceeds a first predetermined threshold and an amount of visible light emitted from said document is below a second predetermined threshold.

20. The method of claim 17 wherein the authenticity of said document is determined relative to genuine United States currency and wherein a positive determination of authenticity is made regarding said document only if an amount of ultraviolet light reflected from said document exceeds a first predetermined threshold and an amount of visible light emitted from said document is below a second predetermined threshold.

21. The method of claim 17 wherein said step of detecting ultraviolet light reflected by said document comprises taking a number of samples of amounts of ultraviolet light reflected by said document and averaging said samples to obtain a reflected ultraviolet average and wherein said step of detecting visible light emitted from said document comprises taking a number of samples of amounts of visible light emitted from said document; and wherein a negative determination of authenticity is made regarding said document if either said reflected ultraviolet average does not exceed a first predetermined threshold or any of said samples of the amount of visible light exceeds a second predetermined threshold.

22. The method of claim 15 wherein said ultraviolet light detecting step further comprises the step of filtering said light to be detected through an ultraviolet filter.

23. The method of claim 22 wherein said visible light detecting step further comprises the step of filtering said light to be detected through a blue filter.

24. The method of claim 23 wherein said blue filter comprises a blue component filter and a yellow component filter.

25. The method of claim 15 wherein said ultraviolet light detecting step further comprises the step of filtering out light having a wavelength longer than 400 nm.

26. The method of claim 25 wherein said visible light detecting step further comprises the step of filtering out light having a wavelength shorter than 400 nm.

27. The method of claim 26 wherein said ultraviolet filtering step comprises the step of filtering out light having a wavelength shorter than about 260 nm and light having a wavelength longer than about 380 nm and wherein said visible light detecting step further comprises the step of filtering out light having a wavelength shorter than about 415 nm and light having a wavelength longer than about 620 nm.

28. The method of claim 15 wherein said ultraviolet light detecting step is performed by a detector which is not sensitive to light having a wavelength longer than 400 nm and wherein said visible light detecting step is performed by a detector which is not sensitive to light having a wavelength shorter than 400 nm.

29. A device for authenticating documents comprising:
an ultraviolet light source for illuminating a document to be tested;

an ultraviolet light detector for generating an output signal responsive to ultraviolet light reflected by said document; and a signal processor for receiving said ultraviolet detector output signal and determining the authenticity of said document based upon said output signal.

30. The device of claim 29 wherein said output signal is responsive to the presence or absence of ultraviolet light reflected from one or more areas of said document.

31. The device of claim 30 wherein the authenticity of said document is determined relative to genuine currency.

32. The device of claim 31 wherein the authenticity of said document is determined relative to genuine United States currency.

33. The device of claim 29 wherein said detector detects a pattern of ultraviolet light reflected by said document.

34. The device of claim 33 wherein the authenticity of said document is determined relative to genuine currency.

35. The device of claim 34 wherein the authenticity of said document is determined relative to genuine United States currency.

36. The device of claim 29 wherein said output signal is responsive to the amount of ultraviolet light reflected from one or more areas of said document.

37. The device of claim 36 wherein the authenticity of said document is determined relative to genuine currency.

38. The device of claim 37 wherein the authenticity of said document is determined relative to genuine United States currency and wherein a negative determination of authenticity is made regarding said document if a relatively high amount of ultraviolet light is not reflected from said document.

39. The device of claim 29 wherein said ultraviolet light detector comprises a photodetector and an ultraviolet filter wherein light from said bill passes through said ultraviolet filter before striking said photodetector.

40. The device of claim 29 wherein said ultraviolet light detector comprises a photodetector and a first filter wherein light from said bill passes through said first filter before striking said photodetector; said first filter filtering out light having a wavelength longer than 400 nm.

41. The device of claim 40 wherein said first filter filters out light having a wavelength shorter than about 260 nm and light having a wavelength longer than about 380 nm.

42. The device of claim 40 wherein said filter has a peak transmittance wavelength of about 360 nm.

43. The device of claim 29 wherein said detector is not sensitive to light having a wavelength longer than 400 nm.

44. A device for authenticating documents comprising:

an ultraviolet light source for illuminating a document to be tested;

an ultraviolet light detector for generating an output signal responsive to ultraviolet light reflected by said document;

a visible light detector for generating an output signal responsive to visible light emitted by said document upon illumination of said document by said ultraviolet light source; and a signal processor for receiving said ultraviolet light detector output signal and said visible light detector output signal and determining the authenticity of said document based upon said ultraviolet light detector output signal and said visible light detector output signal.

45. The device of claim 44 wherein said ultraviolet light detector output signal is responsive to the amount of ultraviolet light reflected from one or more areas of said document and said visible light detector output signal is responsive to the amount of visible light emitted from one or more areas of said document.

46. The device of claim 45 wherein the authenticity of said document is determined relative to genuine currency.

47. The device of claim 46 wherein the authenticity of said document is determined relative to genuine United States currency and wherein a positive determination of authenticity is made regarding said document only if a relatively high amount of ultraviolet light is reflected from said document and virtually no amount of visible light is emitted from said document.

48. The device of claim 46 wherein the authenticity of said document is determined relative to genuine United States currency and wherein a negative determination of authenticity is made regarding said bill if either (1) less than a first predetermined amount of reflected ultraviolet light is detected from said bill or (2) more than a second predetermined amount of visible light is detected from said bill.

49. The device of claim 48 wherein said first predetermined amount is a relatively high amount and wherein said second predetermined amount is a very low amount.

50. The device of claim 48 wherein said first predetermined amount is set equal to approximately one-half the amount expected from genuine United States currency.

51. The device of claim 44 wherein said ultraviolet light detector comprises a first photodetector and an ultraviolet filter wherein light from said bill passes through said ultraviolet filter before striking said first photodetector.

52. The device of claim 51 wherein said visible light detector comprises a second photodetector and a blue filter wherein light from said bill passes through said blue filter before striking said second photodetector.

53. The device of claim 52 wherein said blue filter is a single blue filter; said single blue filter filtering out light having a wavelength shorter than about 415 nm and light having a wavelength longer than about 620 nm; said single blue filter having a peak transmittance wavelength of about 450 nm.

54. The device of claim 52 wherein said blue filter comprises a blue component filter and a yellow component filter.

55. The device of claim 44 wherein said ultraviolet light detector comprises a first photodetector and a first filter wherein light from said bill passes through said first filter before striking said first photodetector; said first filter filtering out light having a wavelength longer than 400 nm.

56. The device of claim 55 wherein said visible light detector comprises a second photodetector and a second filter wherein light from said bill passes through said second filter before striking said second photodetector; said second filter filtering out light having a wavelength shorter than 400 nm.

57. The device of claim 56 wherein said first filter filters out light having a wavelength shorter than about 260 nm and light having a wavelength longer than about 380 nm and wherein said second filter filters out light having a wavelength shorter than about 415 nm and light having a wavelength longer than about 620 nm.

58. The device of claim 56 wherein said first filter has a peak transmittance wavelength of about 360 nm.

59. The device of claim 44 wherein said ultraviolet light detector is not sensitive to light having a wavelength longer than 400 nm.

60. The device of claim 44 wherein said visible light detector is not sensitive to light having a wavelength shorter than 400 nm.

61. A system for authenticating documents comprising:

an ultraviolet light source for illuminating a document to be tested;

a reflected ultraviolet light testing apparatus comprising
an ultraviolet light detector for generating an output signal responsive to ultraviolet light reflected by said document; and
a signal processor for receiving said ultraviolet detector output signal and determining the authenticity of said document based upon said output signal; and means for selectively activating said reflected ultraviolet light testing apparatus.

62. A system for authenticating documents comprising:

an ultraviolet light source for illuminating a document to be tested;

a reflected ultraviolet light testing apparatus comprising
an ultraviolet light detector for generating an output signal responsive to ultraviolet light reflected by said document;

a visible light testing apparatus comprising
a visible light detector for generating an output signal responsive to visible light emitted by said document in response to said document being illuminated with ultraviolet light;

means for selectively activating said reflected ultraviolet light testing apparatus;

means for selectively activating said visible light testing apparatus; and a signal processor for receiving said ultraviolet light detector output signal and for receiving said visible light detector output signal and determining the authenticity of said document based upon said ultraviolet light detector output signal if said ultraviolet light testing apparatus is activated and/or based upon said visible light detector output signal if said visible light testing apparatus is activated.

63. A method of authenticating documents comprising the steps of:

illuminating a document with ultraviolet light;

detecting ultraviolet light reflected by said document; and determining the authenticity of said document based upon a comparison of the ultraviolet light reflected from said bill with the ultraviolet light reflected from a genuine document illuminated with ultraviolet light;

wherein the authenticity of said document is determined relative to genuine United States currency and wherein a negative determination of authenticity is made regarding said document if an amount of ultraviolet light detected by said step of detecting ultraviolet light reflected from said document does not exceed a predetermined threshold.

64. The method of claim 63 wherein said step of detecting ultraviolet light reflected by said document comprises taking a number of samples of amounts of ultraviolet light reflected by said document and averaging said samples to obtain an average and wherein a negative determination of authenticity is made regarding said document if said average does not exceed a predetermined threshold.

65. The method of claim 63 wherein said predetermined threshold is set such that a negative determination of authenticity is made if an amount of ultraviolet light detected by said step of detecting ultraviolet light reflected by said document is less than or equal to one-half an amount of ultraviolet light expected to be detected from a genuine United States bill.

66. The method of claim 65 wherein a detector is used for said step of detecting ultraviolet light reflected by said document; wherein said detector generates an output voltage based on the amount of ultraviolet light detected; and wherein a negative determination of authenticity is made if the voltage generated by said step of detecting ultraviolet light reflected by said document is less than or equal to one-half a voltage expected for a genuine United States bill.

67. A device for authenticating documents comprising:

an ultraviolet light source for illuminating a document to be tested;

an ultraviolet light detector for generating an output signal responsive to ultraviolet light reflected by said document; and a signal processor for receiving said ultraviolet detector output signal and determining the authenticity of said document based upon said output signal;

wherein the authenticity of said document is determined relative to genuine currency and wherein a negative determination of authenticity is made regarding said document if an amount of ultraviolet light reflected from said document does not exceed a predetermined threshold.

68. The device of claim 67 wherein the authenticity of said document is determined relative to genuine United States currency.

69. The device of claim 68 wherein said ultraviolet light detector takes a number of samples of amounts of ultraviolet light reflected by said document and generates a number of output signals; wherein said signal processor averages said number of output signals to obtain an average and wherein a negative determination of authenticity is made regarding said document if said average does not exceed a predetermined threshold.

70. The device of claim 67 wherein said ultraviolet light detector takes a number of samples of amounts of ultraviolet light reflected by said document and generates a number of output signals; wherein said signal processor averages said number of output signals to obtain an average and wherein a negative determination of authenticity is made regarding said document if said average does not exceed a predetermined threshold.

71. The device of claim 67 wherein said predetermined threshold is set such that a negative determination of authenticity is made if an amount of ultraviolet light detected by said ultraviolet light detector is less than or equal to one-half an amount of ultraviolet light expected to be detected from a genuine United States bill.

72. The device of claim 71 wherein said ultraviolet light detector generates an output voltage based on the amount of ultraviolet light detected; and wherein a negative determination of authenticity is made if the voltage generated is less than or equal to one-half a voltage expected for a genuine United States bill.

* * * * *